(No Model.) 4 Sheets—Sheet 2.
J. G. JORDAN.
EARTH AUGER.
No. 600,875. Patented Mar. 22, 1898.
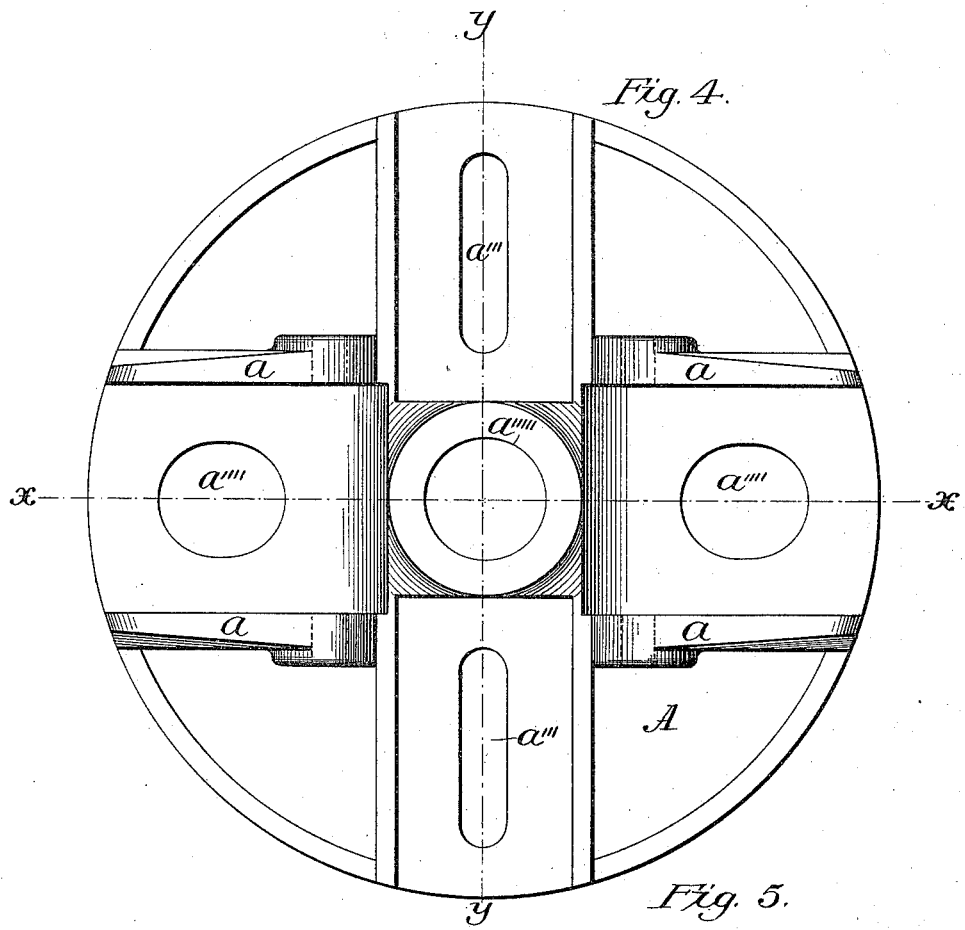
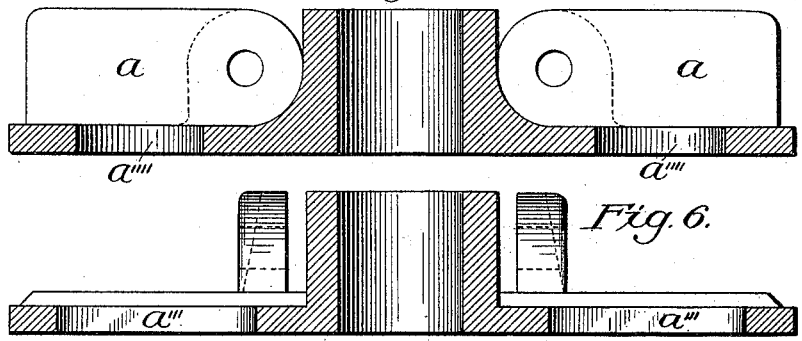
Witnesses.
Grant Henry
M. Wilkinson
Inventor:
J. G. Jordan (No Model.) 4 Sheets—Sheet 3.

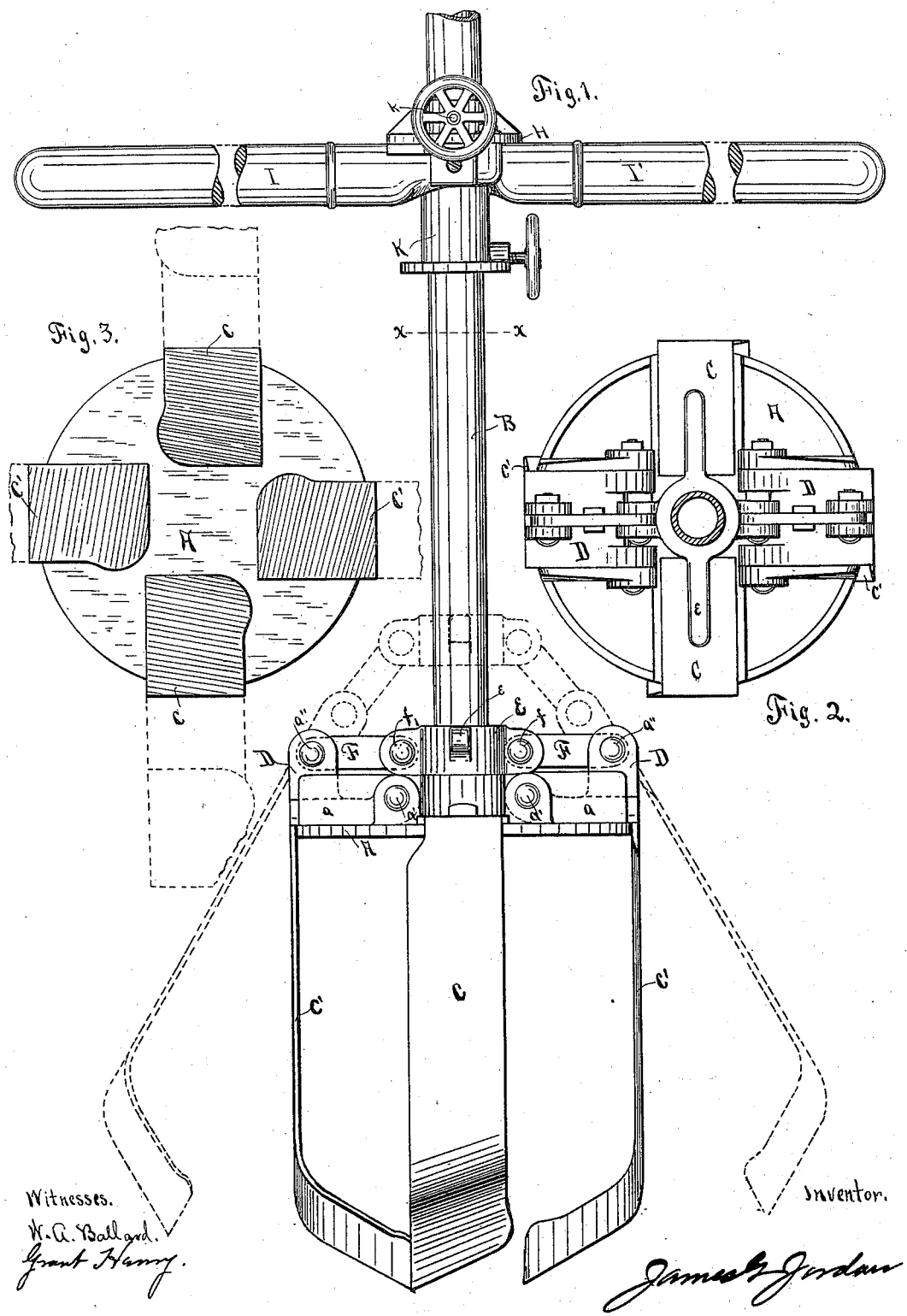

J. G. JORDAN.
EARTH AUGER.

No. 600,875. Patented Mar. 22, 1898.

Witnesses.
W. A. Ballard.
Grant Henry.

Inventor.
James G. Jordan (No Model.) 4 Sheets—Sheet 4.

J. G. JORDAN.
EARTH AUGER.

No. 600,875. Patented Mar. 22, 1898.

Witnesses.
W. A. Ballard.
Grant Henry.

Inventor.
James G. Jordan

UNITED STATES PATENT OFFICE.

JAMES G. JORDAN, OF DES MOINES, IOWA.

EARTH-AUGER.

SPECIFICATION forming part of Letters Patent No. 600,875, dated March 22, 1898.

Application filed February 19, 1895. Serial No. 539,014. (No model.)

*To all whom it may concern:*

Be it known that I, JAMES G. JORDAN, a citizen of the United States, and a resident of the city of Des Moines, county of Polk, and State of Iowa, have invented a new and useful Earth-Auger, of which the following is a full, clear, and accurate specification.

My improvement relates generally to that class of boring-tools known as "earth-augers," used principally for boring holes wherein to set fence-posts and the like or for prospecting, and specifically to an auger adapted to bore holes larger and of greater depth than for ordinary fence-posts and of any desired diameter and depth. The device so invented by me is that described in this specification, pointed out in my claims, and illustrated in the accompanying drawings, in which—

Figure 11:
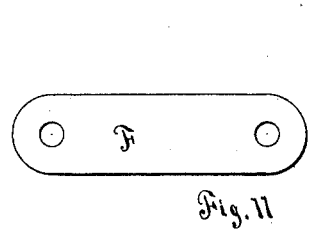
Figure 7:
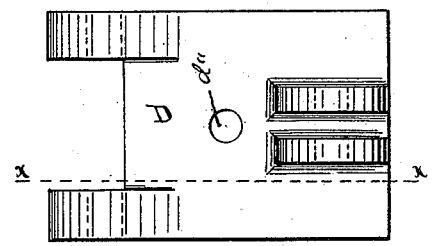
Figure 12:
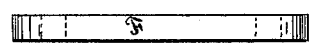
Figure 8:
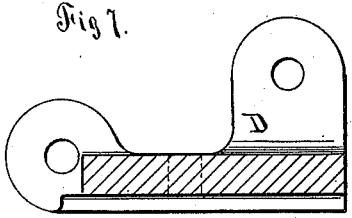
Figure 9:
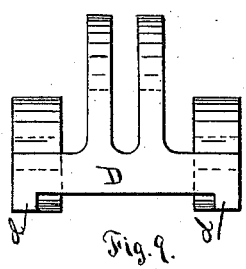
Figure 13:
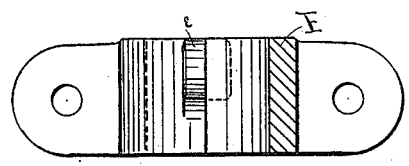
Figure 14:
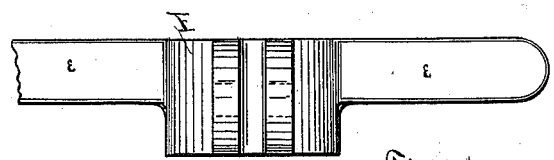
Figure 15:
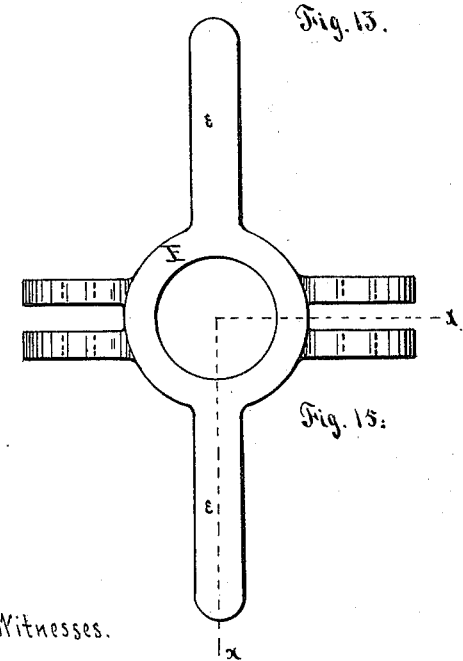
Figure 10:
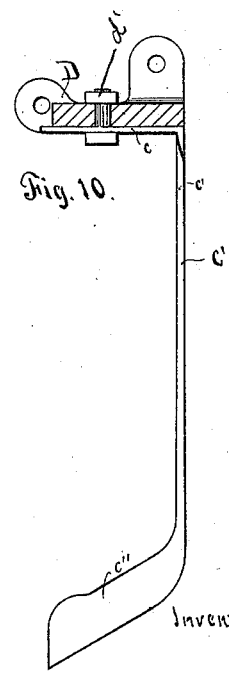
Figure 16:
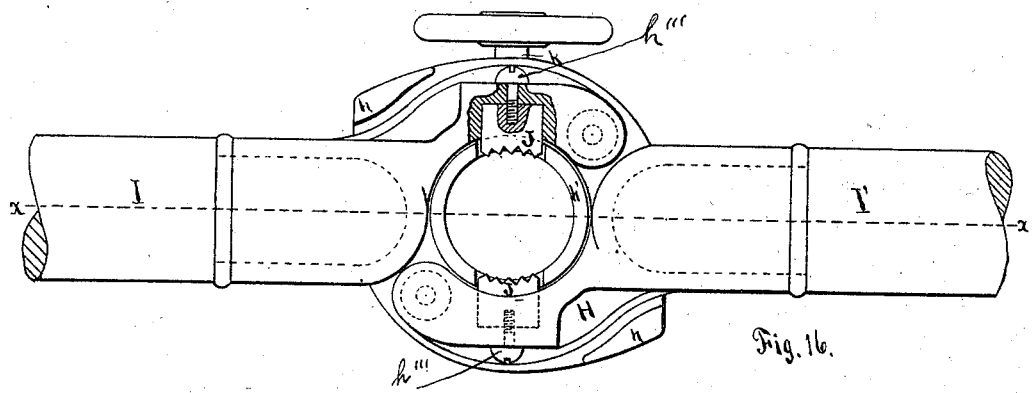
Figure 17:
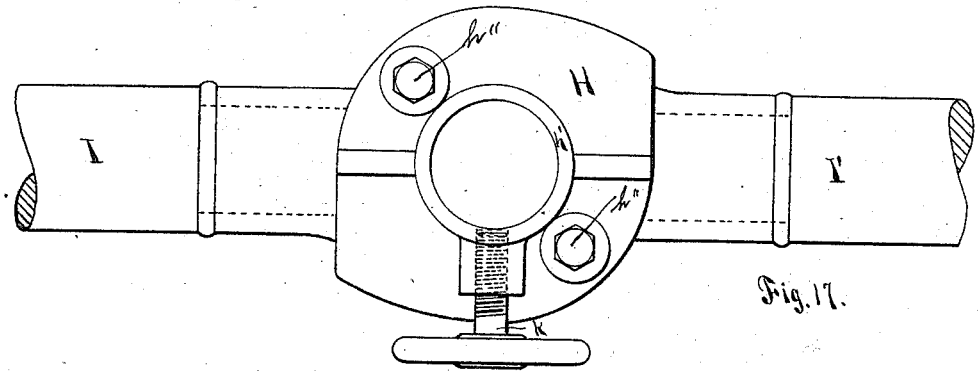
Figure 18:
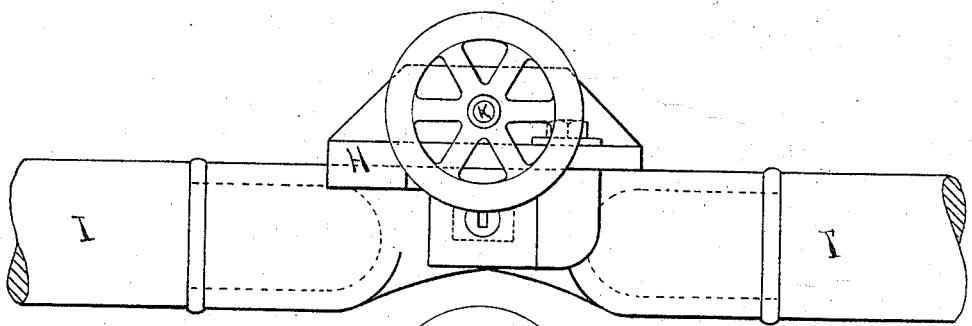
Figure 19:
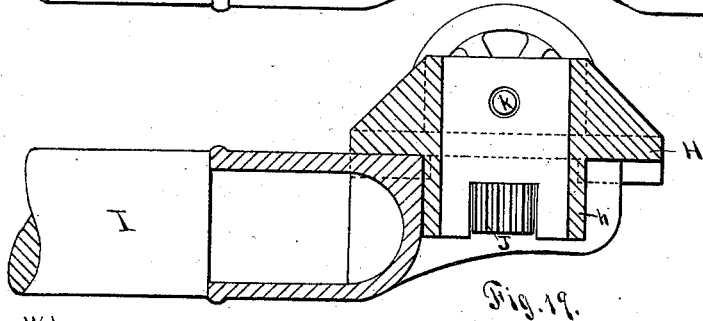

Figure 1 is a side view of the auger with all parts assembled. Fig. 2 is a sectional plan from the line X X of Fig. 1. Fig. 3 is a bottom plan view of the auger. Fig. 4 is a top plan view of the solid disk about which the auger-blades are assembled. Fig. 5 is a section at the line X X of Fig. 4. Fig. 6 is a section at the line Y Y of Fig. 4. Figs. 7, 8, and 9 are detail views of the hinge-piece D, shown in Fig. 2, Fig. 7 being a plan view, Fig. 8 a section on the line X X of Fig. 7, and Fig. 9 an end view of the said member. Fig. 10 is a sectional view of the hinge-piece D with the blade attached. Figs. 11 and 12 are respectively plan and side views of the locking-link F shown in Fig. 1. Fig. 13 is a side view, partly in section, of the locking-sleeve E. Fig. 14 is a side view of the locking-sleeve. Fig. 15 is a plan view of the same locking-sleeve. Figs. 16, 17, 18, and 19 are detail views of the form of auger-handle shown with the completed tool in Fig. 1, Fig. 16 being a bottom plan, Fig. 17 a top plan, Fig. 18 a side view, and Fig. 19 a section along the line X X of Fig. 16 with one of the handles removed.

The construction and operation of the auger the subject of my invention are as follows:

As shown in Figs. 1, 2, and 3, this auger consists, essentially, of a disk A, mounted on a stem B and carrying four blades $c\ c\ c'\ c'$, two of which blades, $c\ c$, are adjustably secured to the said disk by bolts, and the other two, $c'\ c'$, are secured to hinge-pieces D D, which hinge-pieces are pivoted by means of bolts $a'$ between lugs $a\ a$, cast on the top of the disk A. These hinge-pieces carry on their upper and outward ends lugs, between which and a locking-sleeve E, sliding on the stem B, are pivoted by means of bolts $a''$ and $f$, locking-links F F. The blades $c\ c\ c'\ c'$, as will be seen in Fig. 2, are placed at quadrants on the disk, the two fixed blades being set one hundred and eighty degrees apart, as are also the two hinged blades $c'\ c'$, but with the axial line of their head portions at right angles to the axial lines of the head portions of the said fixed blades $c\ c$. The fixed blades $c\ c$ are adjustable radially by means of the slots $a'''\ a'''$, Figs. 4 and 6, through which and a hole through the head portions of the blades $c\ c$ suitable bolts are passed.

On the stem B is mounted the handle shown and described herein, by means of which a rotary motion may be given the auger.

The blades $c\ c\ c'\ c'$ are formed from straight bar-steel of relatively thin rectangular cross-section and are shaped by bending one end portion thereof to a right angle with the body of the blank, the said bend being across the short dimension of the cross-section, the portion thus bent being termed the "head" portion $c$, Fig. 10, then leaving a straight intermediate portion $c'$, Fig. 10, for the "body" of the blade, and afterward turning from this body portion at the end opposite the head but on the same side a broadly-flattened "point" $c''$, Fig. 10, this point being formed by bending the yet unused portion of the blank at an angle of from thirty to forty-five degrees from the plane of the body portion and at the same time giving to the said point portion a twist into an approximately helical form and finally swaging the lower end and forward side of the helically-bent portion or point and the corresponding side of the body portion to a cutting edge, the said point portion being wider than the body portion.

It is obvious that a great advantage has been conceived in the combination of the several important features comprised in the formation of the form of blade shown in Fig. 10 and that their value as a whole cannot be lightly estimated, as from practice it has been clearly demonstrated that each particular feature performs a function which taken as a whole has made a decided advance in this art over those heretofore generally employed, as will hereinafter be more fully described. It will be seen that the extreme points of the blades are at the extreme end of the forward side of the helically-bent point portion. Now in the rotation of the auger when the blades are assembled the cutting of the earth which first takes place at said extreme points will proceed upward along the remainder of the forward side of the helically-bent point portion of the blades until the straight body portion has been reached. Thus the whole forward side of the point portion is constantly cutting the earth. The broad receding end portion which has a cutting edge is also constantly cutting the earth, and said broadly-flattened point portion as a whole retains the earth in the auger when being lifted from the bore, and the straight body portion performs a reaming action and assists in keeping the auger vertical in the bore.

In assembling the blades about the disk the head portion of each is so disposed as to bring its axis radial and with the axis of the body portion the same distance from the axis of the disk or the auger as a whole as the distance from said principal axis to the axis of the opposite blade, thus making the disposition of each pair of blades symmetrical about the principal axis of the auger. Normally all the blades are equidistantly disposed about the principal axis of the auger; but in cases where it is desired to bore larger holes than the diameter of the disk the blades $c\ c$ are moved outward radially to the required diameter, while the hinged blades $c'$ remain at a fixed distance from the axis of the auger, thereby effecting a decided gain in the efficiency of the auger from reasons hereinafter explained at length. The sine of the angle to which the point portions are bent being less than the radius of the disk about which the blades are assembled an opening is left between the ends of the blades' points, as shown in Fig. 3, even when the auger is at its smallest diameter.

The helically-formed blade-points disposed as above described form a hollow four-threaded interrupted screw with its axis coincident with the principal axis of the auger. It is obvious that if these points be placed against a penetrable material, such as earth, and the disk, by means of torsion applied to the stem, be rotated these blade-points, carrying with them the body portions of the blades and rotation being kept up, will continue to so penetrate so long as there is room for the material cut through between the points and the blade-carrying disk. It will now be seen how by continuing the rotation of the disk after the space inclosed within the blades is full of earth at its normal density the material within may be packed very closely into said space, it being remembered that the blades are constantly feeding downward into yet uncut earth, which, as fast as cut through, is passed upward within the auger and compresses that already in such space. As has been noted, the upward movement of the earth through the auger is stopped by the disk at the upper end of the blades. The cutting edges of the straight body portion of the blades act as reamers in the hole cut by the advancing points, and make of it a smooth cylindrical bore. The auger being full of earth, held within the blades in the form of a solid "plug" or core, it is withdrawn from the bore and the impacted earth dumped out. This last operation is effected by resting the auger on the ground on the ends of the fixed blades $c\ c$, then pulling up on the locking-sleeve E by means of the handles $e$, cast integral therewith, which upward motion of the locking-sleeve, through the medium of the locking-links F F, pulls up the free ends of the hinge-pieces D, and with them the dumping-blades $c'\ c'$, as indicated by dotted lines in Fig. 1. The dumping-blades being in this position the plug or core of earth removed from the bore will fall out of the auger by gravity, owing to its support being removed, and the sleeve being now released from the hand of the operator the blades and all connected parts of the locking mechanism will by gravity automatically assume their normal positions on or about the disk or head of the auger and lock the blades in operative position for boring. The operation of boring and emptying the auger of its core of earth is repeated until the required depth of hole is reached.

It is obvious from an inspection of Fig. 9 of the drawings that the hinge-pieces D are provided on their undersides with ribs $d$ and a bolt-hole $d''$, Fig. 7. The dumping-blades also being provided with bolt-holes are secured to said hinge-pieces by means of suitable bolts $d'$, Fig. 10, said bolt-heads passing through holes $a''''$. Fig. 4 affords a firm bearing for said hinge-pieces on the disk A. It is thus seen that lateral displacement of the dumping-blades $c'\ c'$ is prevented. It is also clear from an inspection of the drawing Fig. 1 that the blades $c'\ c'$ cannot swing outward without moving the sleeve E along the stem B or else shortening the links F. The first motion—sliding the sleeve E along the stem D—is impossible, as it normally rests on a boss $a'''''$, cast on the disk, so a downward movement cannot take place, and upward motion is resisted by gravity, and, again, the thrust from the links F F is nearly in a horizontal plane, and from the two links in opposite directions counteracting each other without in any wise tending to lift the sleeve. By so balancing these thrusts against each other friction against the stem B is almost wholly obviated, and need not be considered as an element in the efficiency of the lock, which makes the unlocking and subsequent dumping very much easier when desired, and necessary, by manual power than would be the case if the lock depended largely upon friction between the their forward movement, an adjustable supporting-collar K, Fig. 1, being adjustably secured on the auger-stem for that purpose. The bore being completed or the auger having advanced so far as to necessitate its being emptied of earth, as hereinbefore noted, the handles are used for lifting by tightening the set-screw k against the stem, which will prevent the plate H from sliding on the said stem when manual force is applied to lift the auger from the bore when the auger is lifted and dumped, as above described.

As noted early in this specification, each pair of blades—that is, each two blades diametrically opposite each other—is disposed symmetrically with reference to the axis of the auger. As will be noted from an inspection of Fig. 2, the hinged blades c' c' are not adjustable radially, and always during the operation of boring carry the same position relative to the axis of the auger, no matter what size of hole within the limits of the auger is being bored. The fixed blades c c—that is, those bolted to the disk A and not pivotally mounted—are capable of radial adjustment, as shown by dotted lines in Fig. 3. Now in the operation of boring a hole with the auger set as in Fig. 3—say an eighteen-inch hole with an auger having a twelve-inch disk—it will be observed that the points of all four blades take part in advancing the auger downward, the two inner blades at the central portion of the bottom of the bore and the two outer ones at the outer portion thereof. The reaming action effected by the straight body portion of the blades is now confined to the two outer blades, which are amply sufficient therefor. In addition to cutting through the earth at the central portion of the bore the two inner blades, when the auger is used as above proposed, have another important function. If all the blades were set out to the full diameter of a large hole—say one eighteen inches in diameter, the boring being done with an auger having a twelve-inch disk—the central portion of the plug or core of earth being removed would be almost wholly unsupported and its lifting would be a matter of considerable difficulty, particularly if the earth were of a dry crumbly nature, whereas with the construction shown both the central and outer portions of the earth core are supported, making the removal of a large core of earth a matter of ease and certainty and at the same time without making any of the blades of excessive width or length or otherwise making the tool of inconvenient operation.

Another advantage gained by disposing each pair of blades symmetrically is that by so doing any tendency of the auger in its advance to follow other than its axial line is obviated. Any unsymmetrical arrangement of cutting or of holding blades, or of both, in a large auger is likely to cause the auger to bore a crooked tortuous hole, which, particularly in the larger sizes and in holes of considerable depth, is a matter of extreme inconvenience. To be satisfactory and easy in operation, the auger must be capable of making a straight vertical bore without calling for the exercise of skill or severe physical exertion on the part of the workmen employed.

Otherwise than with the particular construction of auger shown and described herein the same results could only be obtained by the use of more blades and the use of a disk adapted to substantially fit each size of hole to be bored, either of which alternatives would render the tool of far less practical utility.

Having thus described my invention, what I claim, and desire to protect by United States Letters Patent, is—

1. An earth-auger consisting of a stem, means for rotating said stem, a head attached to said stem, four blades attached to said head, two of said blades being radially adjustable and diametrically opposite each other, and two other blades non-adjustable radially, also opposite each other but secured to hinged sections pivotally connected to the said head, means for locking said hinged blades in operative position, each of said four blades consisting of a straight body portion, a head portion bent at right angles to said body portion the bending being across the short dimension of cross-section of the body portion, and a broad flattened point portion on the opposite end of the body portion from the head, but on the same side, said point portion being wider than the body portion and bent to an angle of from thirty to forty-five degrees from the body portion, the said point portion being twisted to an approximately helical form, each said blade sharpened across the end of its broad flattened point portion and on the forward edge of said helically-bent point portion and the corresponding edge of the straight body portion, substantially as described and for the purpose stated.

2. An earth-auger comprising a stem, means for rotating said stem, a head attached to said stem with four blades attached thereto, two of said blades being radially adjustable and diametrically opposite each other, and the two other blades non-adjustable radially also opposite each other but pivotally connected to said head, each of said four blades consisting of a straight body portion, a head portion bent at right angles thereto across its short dimension of cross-section, a broad flattened point portion at the opposite end but on the same side of the body as the head portion, said point portion being wider than the body portion and helically bent at an angle of from thirty to forty-five degrees from the body portion and forming the segment of the thread of a hollow interrupted screw, each said blade sharpened across its end and on the forward edge of said helically-bent point portion and the corresponding edge of said body portion, and automatic means for locking said pivotally-connected blades in position for boring, interior surface of the sleeve E and the surface of the stem B. The third alternative—the shortening of the links F F—is impossible, as these links are so proportioned as to amply resist any compressive strain which can be brought upon them by any disposition to swing outward on the part of the blades $c'$ $c'$ during the operation of boring.

It is obvious that as an article of manufacture the above-described locking mechanism may be employed with equal advantage on other forms of earth-augers having hinged head portions, pivotally-connected hinged sections, or pivotally-connected blades.

In some cases when employed with other augers, as above stated, it may not be necessary to use all parts of the locking mechanism. For illustration, the sleeve and link may be employed with advantage in connection with hinged or pivotally-connected parts of such augers with improved practical and mechanical results, which would correspondingly increase their commercial value as well, all of which clearly comes within the scope of my invention.

Two further advantages in the use of this form of blade lie in the facts that with them the feed is wholly automatic (as with the advance of a screw in a nut) and nearly independent of any pressure put upon the auger by the operators, and that on account of the cutting edge of the blades being at an oblique angle to the line of the advance of the auger such roots as may be encountered are easily cut off, and any stones which would normally impede the advance of the auger are thrown upwardly and inwardly by the helical points of the blades and out of the way of the cutting edge of the body portions of the blades.

It has been assumed thus far in the specification that the auger was rotated by any suitable means by which torsion in a horizontal plane could be applied to the stem B. The practical requirements for a tool to meet the demands of service incident to boring holes for telegraph-poles or heavy posts or for boring deep holes in prospecting are that the handle by means of which torsion is applied shall remain at substantially the same height above the surface of the ground throughout the operation of boring a hole deeper than the ordinary post-hole. This precludes the possibility of positioning the handle at a fixed distance from the auger proper, or, in other words, makes its vertical adjustment along the stem imperative, as at the commencement of the bore the handle cannot conveniently for the workmen be more than four feet above the surface of the ground, nor should it even when finishing a ten-foot hole be within one foot of the surface. Again, for convenient operation it must be so constructed as to allow the workmen to rotate the auger in one direction without necessitating walking around the stem or the bore in the process of working. In other words, some means of applying reciprocating motion to the handle is preferable. Further, the handle must be so adapted as to enable its being used to lift the auger with its load of dirt each time it is filled, as it is much easier to lift a given load on a horizontal handle than by grasping a vertical rod. To meet the foregoing-named requirements, I have designed the form of handle shown in the accompanying drawings, which will next be explained in detail.

The handle shown on the auger in the general drawings, Fig. 1, will be first considered. As shown in Figs. 1, 16, 17, 18, and 19, this handle consists, essentially, of a plate H, approximately circular in plan, said plate having a hole through its center slightly larger than the diameter of the auger-stem on which it is to be used and having extending both up and down guiding-collars to keep the plane of plate normal to the surface of the handle. Pivotally secured by means of bolts $h''$ $h''$ on the under side of this plate are two handles I I', each of which said handles carry, secured by means of the screws $h'''$ $h'''$ in its inner side next to the surface of the auger-stem on which the handle is used, steel bits or dies having angular projections which, as the handles are given a to-and-fro motion about their pivoted supports, will so "bite" into the surface of the auger-stem as to cause the said stem to rotate intermittently in one direction, carrying with it the auger proper. In boring a hole with this auger the tool is placed over the location for the hole with one man at either side of the auger-stem, each man grasping one of the handles I I' with his right hand and steadying and directing the auger-stem with his left hand. The handles being at a convenient height for the men to work and as they will naturally be first positioned quite close to their breasts, the men having their arms flexed, the first motion in the operation is for the men to both extend their right arms, which motion swings the handle with the disk J out from the auger-stem, a motion which by the back side of the handles impinging against the lugs $h$ turn the plate H through substantially the same arc as the handles I I' are swung through. The handles being swung out the required distance or at arms' length from the men's bodies the workmen then draw the handles toward themselves, which closes the bits in upon the auger-stem and, in this reverse angular motion, carries the auger through the same angle, and effects the operation of boring. The handles, which in the advance movement of the auger have been carried downward by so much as the "feed" of the helical blades has advanced the auger downward, turn back loosely on the stem and are naturally raised by the men to a normally convenient plane for working and are so kept by the workmen at that plane through the whole operation of boring, provided the auger-stem be of sufficient length. If it be desired to put pressure on the auger to force its feed, such may be done by bearing down on the handles during comprising hinge-pieces to which the heads of said blades are secured, links connecting the outer free ends of said hinge-pieces to a locking-sleeve on the auger-stem, said links normally held at right angles to the axis of said stem, substantially as described and for the purposes stated.

3. An earth-auger comprising a stem, means for rotating said stem, a head portion attached to said stem, and four blades attached to said head substantially at quadrants to each other, two of said blades being secured to hinged sections pivotally connected to the head of the auger, said blades being diametrically opposite each other equidistantly from the axis of the auger, the remaining two of said blades also diametrically opposite each other and equidistant from the said axis as regards themselves, but at a different distance from the axis of the auger than the first-named pair of blades, substantially as described and for the purposes set forth.

4. An earth-auger comprising a stem, means for rotating said stem, a head attached to said stem, and four blades attached to said head substantially at quadrants to each other, two of said blades being hinged to said disk and non-adjustable relative to the axis of the auger and equidistant therefrom, said blades having automatic locking devices to hold them in said position, said locking devices comprising links joining the free outer ends of the hinge-pieces to which said blades are attached and a locking-sleeve on the stem, said links normally held at right angles to the axis of said stem, and two other blades opposite each other and equidistant from the axis of the auger, but at a greater distance from the axis of the auger than the first-named pair of blades, each of said four blades comprising a straight body portion, a head portion bent at right angles thereto across its short dimension of cross-section, a broad flattened point portion at the opposite end but on the same side of the body as the head portion, said point portion being helically bent at an angle of from thirty to forty-five degrees from the body portion and forming a segment of the thread of a hollow interrupted screw, and each blade sharpened across its end and on its forward edge, the point portion of each said blade being of greater width than the body portion thereof, the whole comprising an auger to bore holes of large diameter, the points of the two inner blades so formed as to cut the earth in the central bottom portion of the bore and sustaining same within the auger as the latter is lifted from the bore, and the said points of the two outer blades cutting the earth at the outer bottom portions of the bore, and the straight body portions of the outer pair of blades so formed as to ream the bore into a smooth cylindrical excavation, and conjunctively with their helical point portions and the said inner pair of blades pack the earth against the head and support the earth core in the operation of lifting the auger from the bore, substantially as set forth.

5. In combination in an earth-auger, a stem, a head secured to said stem, a plurality of blades secured to said head, a handle for rotating said head and connected parts, said handle as a whole consisting of a perforated plate adapted to normally slide along the length of the said stem with handles provided with bits or dies pivoted to said plate and carrying disks adapted to intermittently bite into said stem and give same a rotation substantially through the same arc as the said handles are swung through, and means for securing the said handles as a whole to the stem at any point thereof, substantially as described and for the purposes stated.

6. A blade for an earth-auger consisting of a straight body portion, a head portion bent at right angles to said body portion, the said bending being across the short dimension of cross-section of the body portion, and a broad flattened point portion formed on the opposite end of the body portion from the head, but on the same side, said point portion being bent to an angle of from thirty to forty-five degrees from the body portion and said point portion twisted into an approximately helical form, said blade being wider in its twisted point portion than the said body portion, and the end and forward edge of said point portion and the forward edge of said body portion being sharpened to a cutting edge, as shown and described.

7. In an earth-auger, the combination of an auger-head having a section pivotally connected thereto, a cutting-blade secured to said section, a stem secured to said head, a sleeve constructed to normally rest on said head and slide freely on the stem, and a link pivotally connected to said section and sleeve and adapted to lie in substantially the same horizontal plane to lock said pivoted section at a right angle to the stem of the auger.

Signed at Des Moines, Iowa, this 8th day of December, A. D. 1894.

JAMES G. JORDAN.

Witnesses:
GRANT HENRY,
M. WILKINSON.